March 15, 1932.  F. A. PEARSON  1,849,435
GEAR SHIFTING MECHANISM
Filed Nov. 22, 1928  2 Sheets-Sheet 1
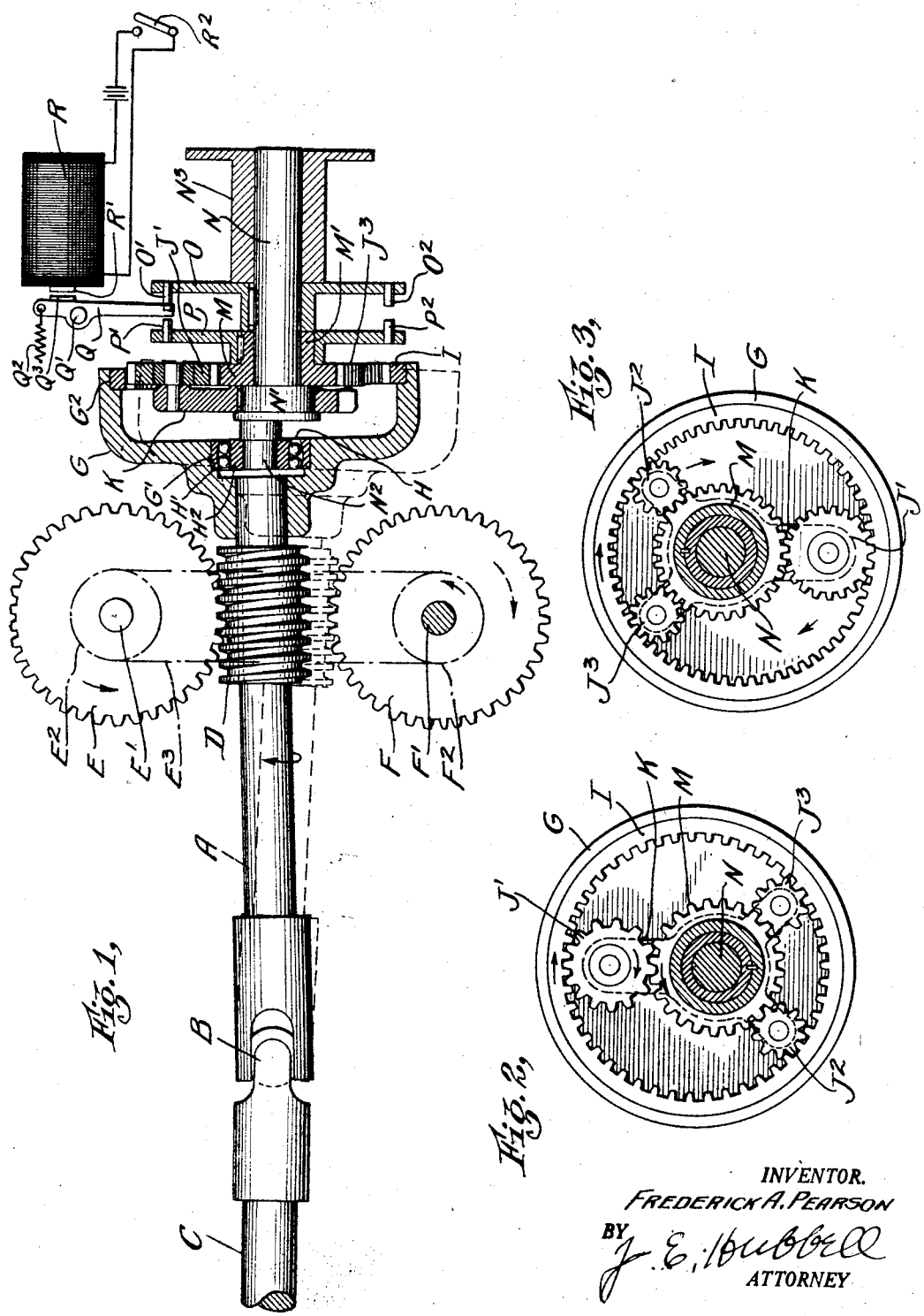
INVENTOR.
FREDERICK A. PEARSON
BY J. E. Hubbell
ATTORNEY March 15, 1932.  F. A. PEARSON  1,849,435
GEAR SHIFTING MECHANISM
Filed Nov. 22, 1928   2 Sheets-Sheet 2
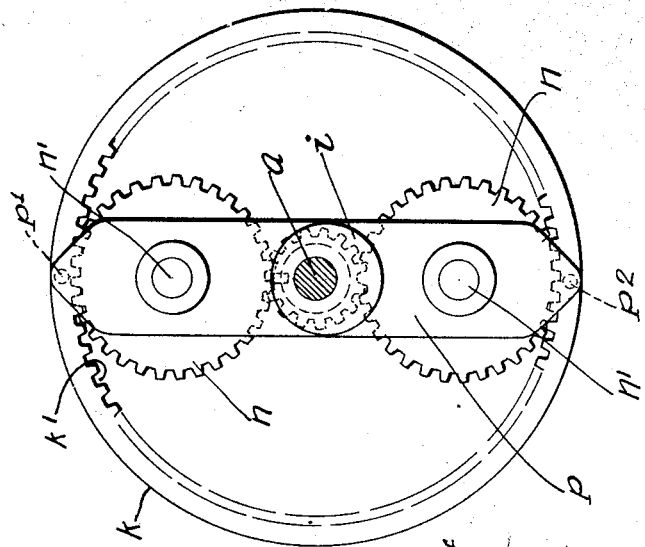
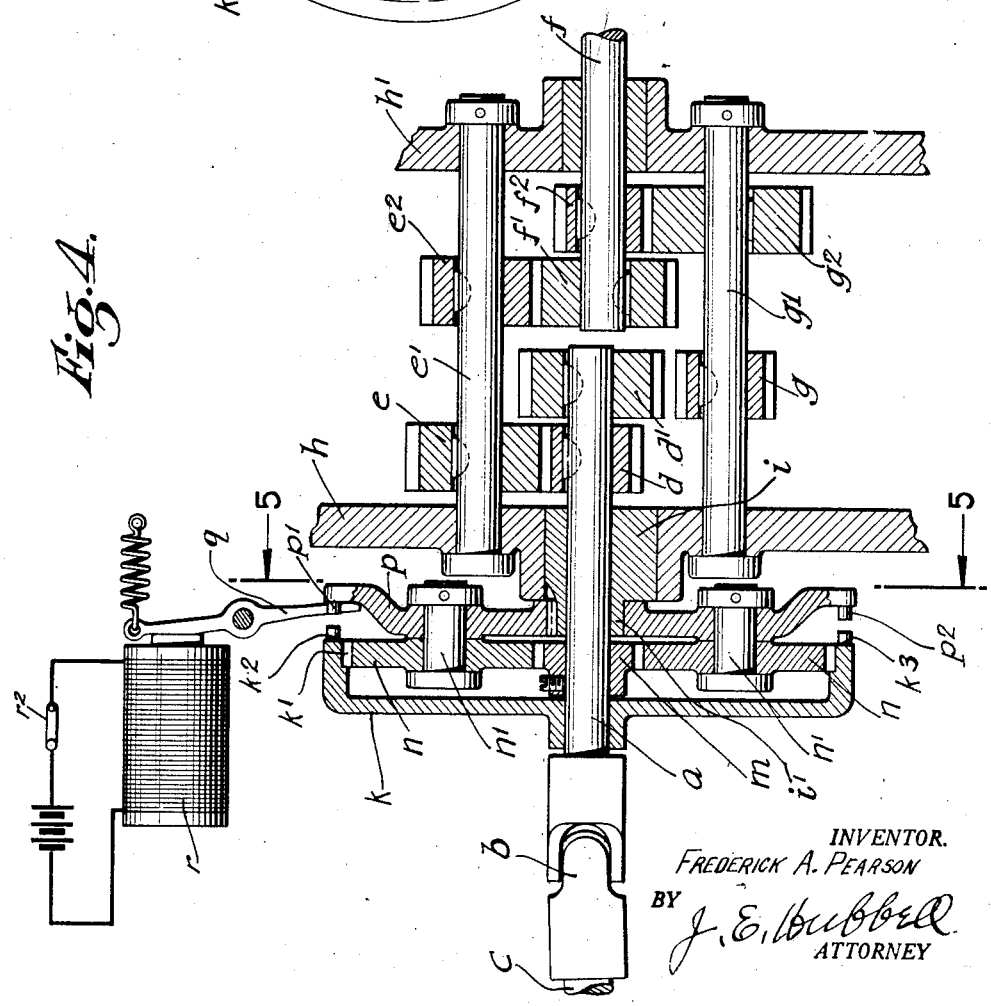
INVENTOR.
FREDERICK A. PEARSON
BY J. E. Hubbell
ATTORNEY Patented Mar. 15, 1932

1,849,435

UNITED STATES PATENT OFFICE

FREDERICK A. PEARSON, OF GREAT BARRINGTON, MASSACHUSETTS

GEAR SHIFTING MECHANISM

Application filed November 22, 1928. Serial No. 321,053.

The present invention relates to mechanism for operatively connecting a driving element to one or more of a plurality of driven elements and the general object of my invention is to provide an improved mechanism for this purpose. More specifically the object of my invention is to provide improved mechanism for connecting a driving element with a driven element spaced therefrom characterized by the utilization of the driving force as the main source of power for the engaging movement, by the application of a minimum amount of applied power, and by an engaging movement having definite time and space limits.

In carrying out my invention, as for example when it is applied to apparatus wherein a driving gear is adapted to be alternately meshed with each of a pair of driven gears, the relative change in position of the gears to be engaged is effected by a planetary gear system, one element of which is connected to one of the gears to be engaged and automatically rotated eccentrically relative to one of the other elements of the system to effect a reversal in direction of rotation and/or a change in angular velocity of a driven shaft.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:

Fig. 1 is an elevation partly in section of a gear shifting mechanism embodying my invention;

Fig. 2 is a view of the planetary gear system for one position of the driving shaft;

Fig. 3 is an elevation of the planetary gear system of Fig. 2 for a second position of the driving shaft;

Fig. 4 is an elevation partly in section of another form of gear shifting mechanism embodying my invention; and Fig. 5 is a section on the line 5—5 of Fig. 4.

In Figs. 1, 2 and 3 of the drawings I have illustrated one embodiment of my invention utilized as a reversing mechanism. In this construction a driving shaft A is connected by a universal joint B to an engine shaft C driven from any suitable source of power. The driving shaft has a worm D arranged to alternately mesh or engage with worm gears E and F on operation of the reversing mechanism. The worm gears E and F are rotatably mounted on shafts E' and F' respectively and preferably provided with teeth having flat edges. The gears are arranged on opposite sides of and normally spaced from the driving worm D. The gears E and F may either be separately connected to the work performing mechanism (not shown) or connected as shown by sprocket wheels $E^2$ and $F^2$, respectively, and an endless chain $E^3$. As indicated by the full and broken lines in Fig. 1, the worm is adapted to be shifted to engage either worm and gear and such shifting results in a change in direction of rotation of the work performing mechanism.

In the construction shown, the gear shifting or reversing mechanism comprises a cup-shaped casing G mounted on and secured to the end of the driving shaft A at the opposite side of the worm from the universal joint. The hub portion of the casing G extending beyond the end of the driving shaft is provided with a recess G' in which the outer race H' of a ball-bearing H is secured. The casing G also carries in a recessed portion $G^2$ in its outer surface an internal gear I forming part of a planetary gear system.

As illustrated in Figs. 1, 2 and 3, the planetary gear system comprises the internal gear I and a plurality of pinion gears J', $J^2$ and $J^3$ rotatably mounted on spaced portions of an arm K and arranged to mesh with the internal gear I and a sun pinion gear M. The arm K is secured on the circumferential surface of a crank disc N′ forming an integral portion of a crank shaft N supported in a bearing N³. A crank pin N² projects from the side of the disc N′ and extends into the recess G′, the inner race H² of the bearing H being secured thereon. The sun gear M is freely rotatable on the shaft N adjacent the crank disc N′. In the planetary gear system shown, the pinion J′ is of greater pitch diameter than the pinions J² and J³, which are shown as of equal diameter. With this arrangement the axes of the shafts A and N are necessarily off-set and if the two shafts are rotated about their respective axes, the internal gear will move eccentrically about the shaft N carrying the shaft A therewith.

In a planetary gear system as shown in Fig. 2, if the internal gear I is rotated and the arm K held to fix the axes of rotation of the pinions J′, J² and J³, then the gear M will be caused to revolve on the shaft N in a direction opposite from that of the internal gear. When the internal gear is rotated and the sun gear M held stationary, then the arm K carrying the pinions will be caused to rotate about its axis of support. When the last mentioned movement occurs with the planetary gear arrangement shown and the arm moves through 180°, then it necessarily results in a simultaneous movement of the internal gear I eccentrically about the sun gear M and shaft N and changes the position of the driving shaft A from that in which the worm D meshes with the worm gear E to a position in which the worm engages the worm gear F.

In the construction shown the means for holding either the sun gear M or arm K fixed in position comprise a disc O secured to the shaft N and a second disc P substantially parallel thereto secured to an annular flange M′ on the sun gear M. The disc O is provided with pins O′ and O² angularly displaced 180° and projecting towards the disc P. The disc P is similarly provided with pins P′ and P² extending in the direction of the disc O. The arm K and the sun gear M are separately held in a fixed position by intercepting and engaging one of the pins on the discs O and P respectively.

As illustrated in Fig. 1 means for this purpose comprise a trip lever Q pivotally mounted at Q′ and arranged to normally intercept one of the pins on the disc O. The trip lever may be operated by any suitable mechanical or electrical device or manually. As shown the lever is normally held in engagement with one of the pins on the disc O by a spring Q² connected to the opposite end of the lever. The lever may be moved from this engaging position to a position in which it intercepts one of the pins on the disc P by energizing an armature coil R whereby an armature R′ attracts a disc of magnetic material Q³ secured to the upper end of the lever. The coil R may be energized or deenergized by closing or opening a switch R² located in an electric circuit connected to the armature coil.

With the parts constructed and arranged as described, and the driving shaft A and internal gear I revolving in the direction indicated by the arrow in Fig. 1 and the worm D driving the worm gear E in the direction indicated, the sun gear M of the planetary system rotates freely on the shaft N due to the engagement of the lever Q with the pin O′. Such engagement holds the shaft N and arm K fixed in position. When it is desired to shift the drive shaft A from engagement with the gear E to a position in which it drives the gear F, the armature coil R is energized by closing the switch R² and the lever Q moved to intercept the pin P′ on the disc P. On this engagement of the lever, the sun gear M becomes fixed in position and the continued rotation of the internal gear I causes the arm K and pinion gears to rotate about the axis of the shaft N. The rotation of the arm and pinions effects an orbital movement of the internal gear I and casing G eccentrically about the axis of the shaft N and moves the drive shaft worm to a position in which it engages the worm gear F. When this position has been reached the switch R² is opened, deenergizing the armature and releasing the lever Q from engagement with the pin P′. Under the action of the spring Q², the lever moves to engage the pin O² which has just reached the engaging position. The disc P and sun gear M then revolve freely until the next reversal takes place. While the control system shown is manually operated, automatic mechanical or electric controls, time or signal operated, may be used in lieu of the manual control.

In Figs. 4 and 5, I have illustrated a modified arrangement of the gear shifting mechanism which differs from the apparatus of Figs. 1 to 3 in that the planetary system is bodily moved through an orbit during the shifting movement. In this embodiment the driving gear and shaft are eccentrically moved to alternately engage gears on the driven shaft, through intermediate idler systems, whereby the angular velocity of the driven shaft is decreased or increased.

In the arrangement shown, a driving shaft $a$ is connected through a universal joint $b$ to an engine shaft $c$. Driving gears $d$ and $d'$ are secured to the end of the shaft $a$. A driven shaft $f$ longitudinally spaced from the shaft $a$ is provided with gears $f'$ and $f^2$ at its end adjacent the gear $d'$. In one position of the driving shaft, the driving connection to the driven shaft consists of the gear $d$, an idler gear $e$ mounted on an idler shaft $e'$, and a second idler gear $e^2$ engaging the driven gear $f'$. In the other position of the driving shaft, the connection consists of the driving gear $d'$, idler gear $g$ on the idler shaft $g'$, and a second idler gear $g^2$ engaging the driven gear $f^2$. As shown, the idler gears $e^2$ and $g^2$ are always meshed with the driven gears $f'$ and $f^2$, respectively, and are in continual motion as long as the driven shaft is moving, whereby the shift can be effected with a minimum amount of acceleration of the idler gears on the idler shaft being engaged. The idler shafts $e'$ and $g'$ are journalled in housing walls $h$ and $h'$. The driving and driven shafts also pass through the housing walls $h$ and $h'$, respectively, the driving shaft being eccentrically mounted in a cam $i$, which is freely rotatable in the housing wall, and the driven shaft being journalled in a fixed bearing.

The gear shifting mechanism comprises a planetary gear system mounted on the driving shaft and the operation is effected as before by engaging one element of the system, whereby a second element is caused to move. In this embodiment, the casing $k$ containing the internal gear $k'$ is rotatably mounted on the driving shaft adjacent the joint $b$. A sun pinion gear $m$ is secured to the shaft $a$ and engages pinion gears $n$ each rotatably mounted on a shaft $n'$ fixed in an arm $p$, which in turn is keyed to an extension $i'$ of the cam $i$. Pins $k^2$ and $k^3$ on the casing $k$ and pins $p'$ and $p^2$ on the arm $p$ are arranged in the same manner as the pins of Fig. 1. The trip lever $q$ and control provisions are identical with those of Fig. 1.

With the parts arranged as described and the driving shaft operating at a constant speed, the arm $p$ is held by the trip lever and the connections to the driven shaft are as shown in Fig. 4. To shift the driving shaft and engage the gears $d'$ and $g$, the casing $k$ is held by the lever whereby the arm $p$ and cam rotate about the cam axis, which is in alignment with the axis of the driven shaft. This movement displaces the driving shaft and the parts are maintained in the new position by the trip lever engaging the pin $p^2$. The teeth of the engaging gears are preferably provided with pointed edge portions.

The various embodiments of my invention are characterized by their simplicity, effectiveness, and ease of control. With the driving shaft operating at a constant rate, the gear shifting period is definite and the arrangements are adapted for remote control. The gear shifting apparatus can be advantageously used where heavy gears must be engaged without the necessity of installing a large amount of extraneous gear shifting mechanism. The extraneous force for shifting need only be sufficient to overcome the force of friction in the planetary gears and the shifting is performed by the power of the driving element.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In apparatus of the character described, a rotatable driving element, a rotatable driven element normally out of engagement with and adapted to be connected to said driving element, and means for operatively connecting said driving element and said driven element, said means comprising a planetary gear system, one rotatable element of said planetary system being eccentrically arranged relative to a second rotatable element of said system, and means for holding one of said eccentrically arranged elements stationary to effect an eccentric movement of the other of said elements.

2. In apparatus of the character described, a rotatable driving element, a plurality of spaced rotatable driven elements adapted to be alternately connected to said driving element, and means for operatively connecting said driving element and one of said driven elements, said means comprising a planetary gear system, one of the elements of said system being movable eccentrically relative to a second element of said system to effect a relative movement of said driving and driven elements into engagement.

3. In apparatus of the character described, a rotatable driving element, a plurality of rotatable driven elements adapted to be alternately connected to said driving element, and means for moving said driving element into engagement with one of said driven elements normally spaced therefrom, said means comprising a planetary gear system, one of the elements of said system being secured on said driving element and eccentrically movable relative to a second element of said system.

4. In apparatus of the character described, a rotatable driving shaft, a plurality of rotatable driven shafts adapted to be alternately connected to said driving shaft, and means for moving said driving shaft into operative engagement with one of said driven shafts normally spaced therefrom, said means comprising a planetary gear system, one of the elements of said system being secured on said driving shaft and means effecting an eccentrical movement of said element relative to a second element of said system on continued rotation of said driving shaft.

5. In apparatus of the character described, a normally rotating driving shaft, a plurality of rotatable driven shafts adapted to be alternately connected to said driving shaft, and means for moving said driving shaft into operative engagement with one of said driven shafts spaced therefrom, said means comprising a planetary gear system, the internal gear of said system being secured on said driving shaft, a sun gear freely rotatable about an axis off-set from said driving shaft, a plurality of pinion gears in operative engagement with said internal gear and sun gear, and means for holding said sun gear fixed in position, whereby said internal gear is moved eccentrically about said sun gear on continued rotation of said driving shaft.

6. In apparatus of the character described, a normally rotating driving shaft, a plurality of rotatable driven shafts adapted to be alternately connected to said driving shaft, and means for moving said driving shaft into operative engagement with one of said driven shafts spaced therefrom, said means comprising a planetary gear system, the internal gear of said system being secured on said driving shaft, a crank shaft normally idle and off-set from said driving shaft, a sun gear freely rotatable on said crank shaft, a plurality of pinion gears in operative engagement with said internal gear and sun gear, and means for holding said sun gear fixed in position, whereby said internal gear is moved eccentrically relative to said crank shaft.

7. In apparatus of the character described, a normally rotating driving shaft, a plurality of rotatable driven shafts adapted to be alternately connected to said driving shaft, and means for moving said driving shaft into operative engagement with one of said driven shafts spaced therefrom, said means comprising a planetary gear system, the internal gear of said system being secured on said driving shaft, a crank shaft normally idle and off-set from said driving shaft, a sun gear freely rotatable on said crank shaft, a plurality of pinion gears in operative engagement with said internal gear and sun gear, and means for holding said sun gear fixed in position, whereby said internal gear is moved eccentrically relative to said crank, said last mentioned means including a disc mounted on said sun gear and means for holding said disc fixed in position at angularly spaced points.

8. In apparatus of the character described, a normally rotating driving shaft, a plurality of rotatable driven shafts adapted to be alternately connected to said driving shaft, and means for moving said driving shaft into operative engagement with one of said driven shafts spaced therefrom, said means comprising a planetary gear system, the internal gear of said system being secured on said driving shaft, a crank shaft normally idle and off-set from said driving shaft, a sun gear freely rotatable on said crank shaft, a plurality of pinion gears in operative engagement with said internal gear and sun gear, and means for holding said sun gear fixed in position, whereby said internal gear is moved eccentrically relative to said crank shaft, said means including angularly spaced stops connected to said sun gear and means for intercepting and holding one of said stops.

9. In apparatus of the character described, a rotatable driving element, a rotatable driven element adapted to be operatively connected to said driving element, and means for moving one of said elements through an eccentric path to effect said connection, said means including a planetary gear system.

10. In apparatus of the character described, a rotatable driving shaft, a rotatable driven shaft normally spaced from and adapted to be operatively connected to said driving shaft, and means for effecting said connection comprising a planetary gear system, one rotatable gear element of which is mounted on said driving shaft and eccentrically movable therewith to effect said connection.

11. In apparatus of the character described, the combination with a power shaft, a driving shaft, having a pivotal connection therewith, and a driven shaft out of axial alignment with and adjacent to said driving shaft, of means for operatively connecting said driving shaft and driven shaft comprising a planetary gear mechanism for effecting an eccentric movement of said driving shaft.

12. In apparatus of the character described, the combination with a driving shaft member and a driven shaft member normally out of engagement and adapted to be connected to said driving shaft member, of shifting mechanism associated with said shaft members for effecting a driving connection therebetween, said mechanism including a planetary gear element movable through an eccentric path during said connecting action.

13. In apparatus of the character described, the combination with a driving shaft member and a driven shaft member normally out of engagement with and adapted to be operatively connected to said driving shaft member, of means utilizing the power of said driving member for moving the latter through an eccentric path to effect said connection.

14. In apparatus of the character described, the combination with a driving shaft member normally rotating about a predetermined axis, of shaft shifting mechanism actuated by the rotation of said shaft for moving the latter through an eccentric path.

15. In apparatus of the character described, a normally rotating driving shaft, a rotatable driven shaft normally out of engagement with said driving shaft and adapted to be operatively connected thereto, and a planetary gear mechanism operatively connected to and having an element eccentrically arranged relative to said driving shaft and on rotation of which element an eccentric movement of said driving shaft is effected to operatively connect said shafts.

Signed at Great Barrington, in the county of Berkshire and State of Massachusetts, this 20th day of November, A. D. 1928.

FREDERICK A. PEARSON.